United States Patent

Merry

[15] 3,642,220

[45] Feb. 15, 1972

[54] TAPE CARTRIDGE

[72] Inventor: Donald D. Merry, Westland, Mich.

[73] Assignee: Rozinante, Inc., Plymouth, Mich.

[22] Filed: Mar. 17, 1969

[21] Appl. No.: 807,815

[52] U.S. Cl. ........................242/55.19 A, 226/181, 226/198
[51] Int. Cl. ........................B65h 17/48
[58] Field of Search ................242/55.19 A, 55.19, 197, 198, 242/199, 200; 352/78, 128; 179/100.22; 174/4 C, 11 C; 226/181, 190, 191, 198

[56] References Cited

UNITED STATES PATENTS

| | | | |
|---|---|---|---|
| 2,778,636 | 1/1957 | Eash | 242/55.19 A |
| 3,078,464 | 2/1963 | Lyon et al. | 242/194 |
| 3,289,963 | 12/1966 | Taylor et al. | 242/55.19 A |
| 3,424,360 | 1/1969 | Trott | 242/55.19 A |

*Primary Examiner*—Billy S. Taylor
*Attorney*—Whittemore, Hulbert & Belknap

[57] ABSTRACT

The tape cartridge is of the type comprising a casing which encloses and rotatably mounts a spool having a reel of endless tape in endless array within the casing. The tape is guided past a reproducing head which is received in the casing through opening means in one end thereof. A spring structure fabricated of a resilient resinous material is provided in the casing for pressing the tape into resilient contact with the reproducing head for replay of the tape.

10 Claims, 4 Drawing Figures

PATENTED FEB 15 1972

3,642,220

INVENTOR
DONALD D. MERRY

BY W. Whittemore, Hulbert & Belknap
ATTORNEYS

TAPE CARTRIDGE

BACKGROUND OF THE INVENTION

Magnetic tape players have recently come into widespread use as entertainment devices in automobiles. Such players generally comprise a playback system including a reproducing head, an amplifier, power supply and speaker system. The magnetic tape is provided in a cartridge as a self-contained unit. A number of different cartridges may be stored in the automobile and used as desired. In order to use a cartridge, it is merely inserted into a slotlike device. The reel of tape, which is arranged in an endless fashion within the cartridge, will play continuously until the cartridge is removed.

The cartridge has opening means in one end thereof. These opening means are on the forward part of the cartridge when the cartridge is inserted into the slot. The reproducing head, which is usually of the stereophonic type, is received through the opening means and presses against the tape. Resilient means are provided within the cartridge in alignment with the opening means. The reproducing head presses the tape against the resilient means to provide the desired sliding pressure contact between the reproducing head and the tape.

The resilient means utilized in the past have had certain disadvantages. One type of resilient means has been a pressure pad formed of urethane foam. A strip of slippery plastic has been provided on the contact face of this foam pad. It has been difficult to maintain consistent quality control of such pads in the manufacturing process, and it has also been difficult to automate the assembly of this nonrigid structure. Further, considerable "crosstalk" has been encountered with use of such pads. The slippery plastic strip provided on the forward face of such pads has had the disadvantage of the edges thereof scraping against the tape and rubbing off lubricant from the back of the tape. Such lubricant is necessary in order that the cartridge will operate satisfactorily. The shelf life of foam pads has also been relatively short and such pads frequently deteriorate after prolonged storage.

Another type of spring structure which has been used has been a phosphor-bronze spring strip which is provided with a felt pad at the free ends thereof for contact with the tape. Such a spring structure has the disadvantages of losing its "memory" after prolonged use, being relatively expensive to manufacture, the felt pads filling with the lubricant on the tape and spilling this throughout the cartridge front end, and it has been difficult to hand assemble this spring structure into the cartridge.

The present invention provides a spring structure which is injection molded from a resinous material and which results in a superior "spring memory" over prolonged use, is relatively easy to assemble either by hand or by automation, does not suffer from prolonged storage, and is less expensive to produce than the prior art spring structures.

SUMMARY OF THE INVENTION

The tape cartridge contains a rotatable spool having a reel of magnetic tape in endless array. The casing encloses and mounts the spool. The casing comprises a base and cover therefor. Guide means are provided in the casing over which the loop portion of the tape is guided for transportation past a reproducing head. The casing has opening means to receive the reproducing head. A spring structure is provided in the casing in alignment with the opening means. The spring structure includes a cantilevered spring element arced towards the opening means for resilient contact with the reproducing head with the tape pressed therebetween in sliding contact therewith.

Figures 1, 4:
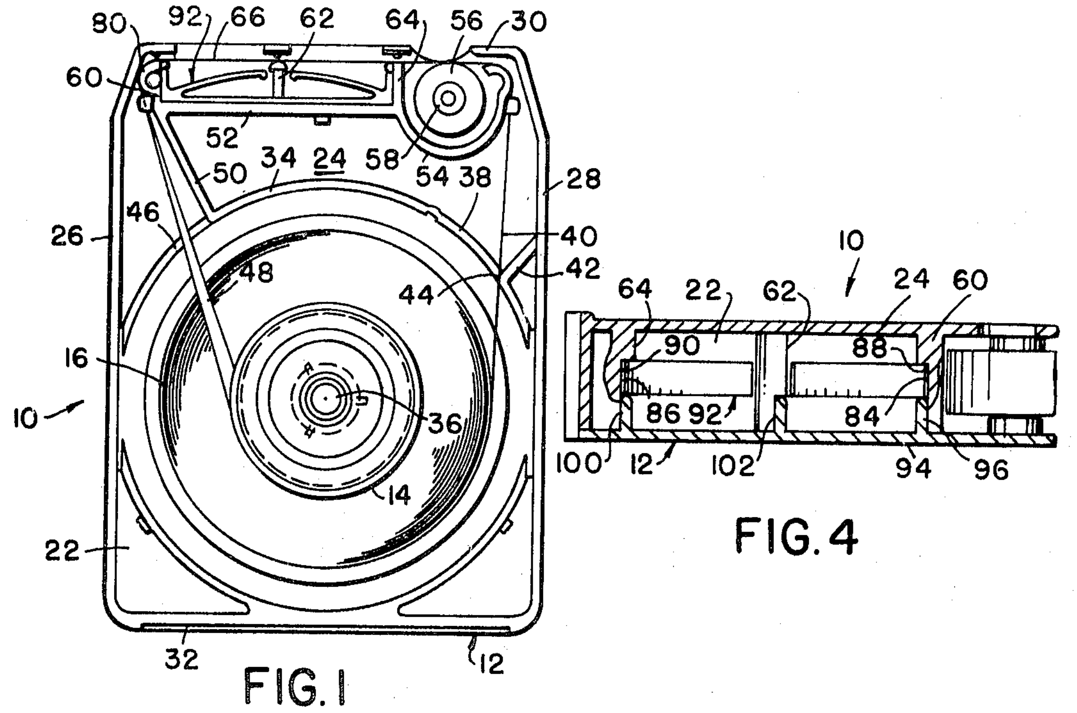
FIG. 1 is a plan view of an assembled cartridge forming one embodiment of the present invention with the cover removed for the purpose of clarity.
FIG. 4 is a sectional view taken substantially along line 4—4 of FIG. 2 looking in the direction of the arrows.
Figure 2:
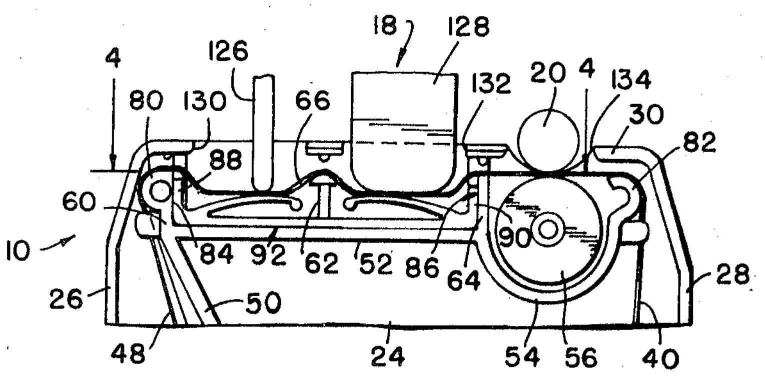
FIG. 2 is an enlarged view of the forward end of the cartridge of FIG. 1.
Figure 3:
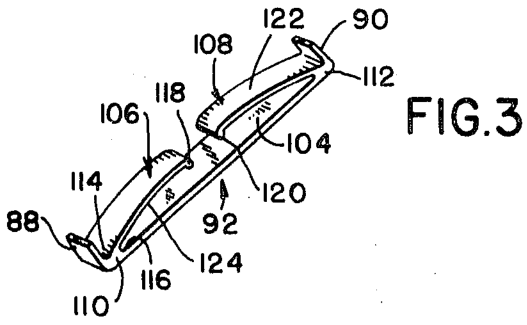
FIG. 3 is a view in perspective of the spring structure forming part of the assembled cartridge.

The magnetic tape cartridge 10, as shown in FIGS. 1, 2 and 3, comprises a casing 12 in which is mounted a spool 14 upon which is would a reel of magnetic recording tape 16 which is arrayed in endless fashion. The tape 16 may be of the stereo or single track type and normally will have recorded thereon various musical compositions for replay through a speaker system.

Such tape cartridges are commonly utilized in automobiles. The replay apparatus in the automobile may be mounted on the dashboard. A slot is provided in the dashboard to receive the cartridge 10. A reproducing head comprising a magnetic pickup structure 18 and drive capstan 20 are provided, as illustrated in FIG. 2, within the replay structure. The replay structure includes an amplifier and power means (not shown) to drive the speaker system. The present invention is concerned with the mechanism for providing sliding contact between the tape and reproducing head for replay.

The cartridge casing 12 has a rectangular configuration with the sides being longer than the ends. The cartridge 10 is relatively thin just being thick enough to accommodate the spool 14 without causing interference or sliding contact with the edges of the tape 16. The casing is preferably fabricated of a tough, low cost plastic material and may be injection molded. The casing 12 comprises two casing halves consisting of a base 22 and a cover 94. The base and cover are securely snap-fastened together by means of structure which is formed integrally therewith.

The base 22, which carries all of the working parts of the cartridge, comprises a backwall 24 having upstanding sidewall structures 26, 28 and end wall structures 30, 32. A cylindrical wall structure 34 is provided within the base 22 substantially tangent to the side walls 26, 28 and end wall 32. The cylindrical wall 34 is joined to the side and end walls by means of a web structure which strengthens the wall structure 34 as well as the side and end walls.

A hub 36 is provided on the back wall 24 at the center of the cylindrical wall 34. The hub 36 rotatably receives the spool 14. A U-shaped notch 38 is provided in the cylindrical wall 34 for passage of the returning tape section 40. A V-shaped indentation 42 extends inwardly from the lower portion of the sidewall 28. The apex 44 is curved to form a guide for tape section 40.

A V-shaped notch 46 is provided in the cylindrical wall 34 for passage of the exiting tape section 48. The tape section 48 is drawn from the spool at the center thereof and is twisted at an angle as will be noted in FIG. 1. The angle of the sidewall of the notch 46 matches the twist in the tape to provide a guide surface therefor.

A wall 50 extends from the notch 46 towards the corner of the base 22. The wall 50 terminates short of the corner and merges with the wall 52 which extends parallel to the end wall 30. The wall 52 terminates short of the opposite sidewall 28 and merges with an arcuate wall section 54 which serves as a housing for a freely rotatable friction guide wheel 56 over which the tape passes as will be noted in FIGS. 1 and 2. A hub 58 is provided for reception of the wheel 56.

Three spaced-apart walls 60, 62, 64 extend perpendicularly from the wall 52 and back wall 24, these walls being provided at the juncture of the walls 52 and back wall 24. The walls 60, 62, 64 terminate short of the end wall 30 to permit passage of the forward playing tape section 66. The forward portions of these walls are rounded for smooth sliding of the tape. Similar curved projections are provided on the inner surface of the end wall 30, also for smooth passage of the tape. A relatively large diameter cylindrical guide portion 80 is provided on the wall 60 as a positive guide surface for the tape to turn the tape section 48 and direct it parallel to the end wall 30. A similar curved guide portion is provided on the arcuate wall section 54 at the opposite side of the casing for the return of the tape back to the spool.

Notches 84, 86 are provided on the oppositely disposed surfaces of walls 60, 64 to receive end walls 88, 90 of spring structure 92. The casing cover 94 has inwardly directed projections 96, 100 which are in alignment with the notches 84, 86 and function to maintain the spring structure 92 in place. A third projection 102 is provided centrally of the projections 96, 100. These three projections also serve to define a closed opening for the tape section 66 to maintain this tape section in proper position for replay.

The spring structure 92 functions to provide the proper pressure contact of the tape section 66 with the forward faces of the pickup structure 18. As will be noted in FIG. 3, the spring structure 92 is an elongated, relatively narrow member comprising a support portion including the end walls 88, 90 which are interconnected by an elongated flat strip base portion 104. The base portion 104 rests against the forward surface of the wall 52 when the spring is in position in the cartridge 10. A pair of cantilevered spring elements 106, 108 extend, respectively, from the juncture of the walls 88, 104 and 90, 104, and are arced outwardly from the wall 104 and towards each other. It will be noted that the material 110, 112 at the juncture is relatively massive (considering the overall size of the spring structure) to provide strong, firm support for the spring elements 106, 108 at the point of greatest stress concentration. The juncture of the spring elements and wall structure is curved as at 114, 116 to further reduce the stress concentration upon bending or flexing of the spring elements.

The spring elements 106, 108 terminate short of the center of the spring structure to provide clearance for the central wall structure 62 of the base 22. The free ends 118, 120 of the spring elements are rounded for the smooth passage of tape without entanglement with the spring structure. The spring elements 106, 108 extend outwardly of the wall 104 at an angle thereto. The spring elements are curved to reduce the bending stresses and also to provide a relatively large area for contact between the faces of the pickup structure 18 and the tape. This results in good replay characteristics. It will be noted in FIG. 1 that the spring elements, when in the unflexed position, terminate substantially tangentially to a plane which would be perpendicular to the plane of the drawing and parallel to the front faces of the pickup structure. As a consequence, the pickup structure immediately makes the desired contact with a relatively flat portion of the spring elements when it is inserted into the cartridge.

The curvature of the outer surface 122 of the spring element is greater than the curvature of the inner surface 124, that is, the radius of the outer surface is greater than the radius of the inner surface, with the result that the spring elements increase in thickness from the free ends 118, 120 to the junctures with the material 110, 112. The spring elements are thus what may be termed "wedge shaped." Such a wedge shape is desirable from the standpoint of stress concentration. The point of greatest stress, when the spring elements are flexed, is at the juncture with the support structure. The stress concentration is reduced from that point to the free ends, the material adjacent to the free ends, being thinner than the material adjacent the junctures, will bend easier. Thus, bending will take place along the entire length of the spring elements at a relatively uniform rate with the result that there will be no single portion along the spring elements which has substantially more bending angle than other points along the spring elements.

The spring structure 92 is fabricated of a tough, nonoil-absorbent, resilient plastic material such as acetal resin which has good abrasion resistance and good bearing characteristics, that is, it is slippery for a smooth passage of the tape over the surface thereof. The outer surface 122 of the spring elements is given a high polish in order to enhance the bearing characteristics thereof.

In the assembly of the cartridge 10, the spring structure 92 is first inserted into the space between the walls 60, 64 of the base 22. The end walls 88, 90 of the spring structure 92 bear against the walls 60, 64 to form a tight fit. After insertion of the spring structure 92, the cover 94 is snapped in place to thus complete the assembly.

In use of the cartridge 10, the cartridge is inserted into the replay mechanism whereupon the pickup structure 18, comprising a head 128, is inserted into the cartridge 10 through the opening 132. The head 128 first bears against the forward tape section 66 and presses the tape against the spring element 108. Complete insertion of the head 128 causes the spring elements 108 to flex as illustrated in FIG. 2. This provides the desired contact between the tape and the pickup structure for replay purposes. The tape is driven by means of the drive capstan 20 which extends through the opening 134 to bear against the tape and guide wheel 56. This pulls the forward tape section 66 past the pickup structure 18 and draws additional tape from the spool 14 which is caused to rotate. The returning tape section 40 is rewound on the outer periphery of the spool.

Spring element 106 is flexed by the sensing switch 126 to enable positive contact with the sensing foil and thereby activate the automatic track selection mechanism in the playback machine, not shown.

What I claim as my invention is:

1. In a tape cartridge containing a rotatable spool having a reel of magnetic tape in endless array, a casing enclosing and mounting the spool, said casing comprising a base and a cover therefor, guide means in the casing over which a loop portion of the tape is guided for transportation past a reproducing head, said casing having opening means to receive a reproducing head, a spring structure in the casing in alignment with said opening means, said spring structure including a cantilevered spring element arced toward said opening means for resilient substantially tangential contact with the reproducing head with the tape pressed therebetween in sliding contact therewith, said spring element having a relatively uniform rate of bending along the entire length thereof, said spring element being in the form of a strip angled toward said opening means and having a curvature curving in the direction of the opening means, the radius of curvature of the surface of the spring element facing the opening means being greater than the radius of curvature of the opposite surface thereof whereby the thickness of the spring element increases from the free end thereof towards the cantilevered end thereof.

2. A tape cartridge as defined in claim 1, and further characterized in that said spring structure is fabricated of a tough, nonoil-absorbent resilient resinous material having a low coefficient of friction.

3. A tape cartridge as defined in claim 1, and further characterized in that said spring element terminates in a portion substantially tangentially to a plane parallel to a face of the reproducing head.

4. A tape cartridge as defined in claim 1, and further characterized in that the spring element is integral with an elongated base, an enlarged mass of material forming the juncture between the spring element and the base to provide strong support for the spring element.

5. A tape cartridge as defined in claim 1, and further characterized in the provision of an enlarged curved knob at the free end of the spring element for smooth passage of tape thereover.

6. In a tape cartridge containing a rotatable spool having a reel of magnetic tape in endless array, a casing enclosing and mounting the spool, said casing comprising a base and a cover therefor, guide means in the casing over which a loop portion of the tape is guided for transportation past a reproducing head, said casing having opening means to receive a reproducing head, a spring structure in the casing in alignment with said opening means, said spring structure including a cantilevered spring element arced toward said opening means for resilient substantially tangential contact with the reproducing head with the tape pressed therebetween in sliding contact therewith, said spring element having a relatively uniform rate of bending along the entire length thereof, said spring structure including an elongated base from which the spring element extends, an upstanding end wall at each end of the base, a pair of oppositely disposed notches being provided in said base, said spring structure being mounted between said notches with the end walls thereof being received in the notches, and means on the casing cover to secure the end walls of the spring structure within said notches.

7. A tape cartridge as defined in claim 6, and further characterized in that said spring element is in the form of a strip angled toward said opening means and having a curvature curving in the direction of the opening means.

8. In a tape cartridge containing a rotatable spool having a reel of magnetic tape in endless array, a casing enclosing and mounting the spool, said casing comprising a base and a cover therefor, guide means in the casing over which a loop portion of the tape is guided for transportation past a reproducing head, said casing having opening means to receive a reproducing head, a spring structure in the casing in alignment with said opening means, said spring structure including a cantilevered spring element arced toward said opening means for resilient substantially tangential contact with the reproducing head with the tape pressed therebetween in sliding contact therewith, said spring element having a relatively uniform rate of bending along the entire length thereof, said spring structure including an elongated base, said spring element being joined to one end of the base, and a second spring element cantilevered at the other end of the base and arced towards said opening means and towards said first-mentioned spring element whereby the spring structure provides resilient contact with a reproducing head for replay of stereophonic magnetic tapes.

9. A tape cartridge as defined in claim 6, and further characterized in that said spring structure is fabricated of a tough, nonoil-absorbent resilient resinous material having a low coefficient of friction.

10. A tape cartridge as defined in claim 8, and further characterized in the provision of an enlarged curved knob at the free end of each spring element for smooth passage of tape thereover.

* * * * *